United States Patent
Tsunoda et al.

(10) Patent No.: US 7,969,739 B2
(45) Date of Patent: Jun. 28, 2011

(54) HEAT DIFFUSING STRUCTURE OF A PORTABLE ELECTRONIC APPARATUS

(75) Inventors: Yosuke Tsunoda, Kawasaki (JP); Masumi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 12/357,735

(22) Filed: Jan. 22, 2009

(65) Prior Publication Data

US 2009/0207569 A1 Aug. 20, 2009

(30) Foreign Application Priority Data

Feb. 14, 2008 (JP) ................ 2008-033786

(51) Int. Cl.
H05K 7/20 (2006.01)
F28F 7/00 (2006.01)
H04M 1/00 (2006.01)

(52) U.S. Cl. ........ 361/704; 361/714; 361/717; 361/719; 165/80.2; 165/185; 257/713; 455/550.1; 455/347; 455/575.4

(58) Field of Classification Search ............... 361/704, 361/714, 717, 719; 165/80.2, 185; 174/15.1, 174/16.3; 257/712, 713; 455/575.1, 550.1, 455/347, 575.4
See application file for complete search history.

(56) References Cited

U.S. PATENT DOCUMENTS

| | | | |
|---|---|---|---|
| 6,324,055 B1 | 11/2001 | Kawabe | |
| 6,343,010 B1 | 1/2002 | Tanaka | |
| 6,377,453 B1 | 4/2002 | Belady | |
| 6,487,073 B2 * | 11/2002 | McCullough et al. | 361/679.54 |
| 7,286,360 B2 * | 10/2007 | Sohn | 361/704 |
| 7,330,354 B2 * | 2/2008 | Watanabe | 361/705 |
| 7,417,863 B2 * | 8/2008 | Park | 361/719 |
| 2005/0176471 A1 | 8/2005 | Masuda et al. | |
| 2006/0198101 A1 * | 9/2006 | Cho | 361/687 |
| 2006/0274506 A1 * | 12/2006 | Huang et al. | 361/704 |

FOREIGN PATENT DOCUMENTS

| | | |
|---|---|---|
| JP | 08-162576 A | 6/1996 |
| JP | 11-249761 A | 9/1999 |
| JP | 2000-10661 A | 1/2000 |
| JP | 2000-148305 A | 5/2000 |
| JP | 2001-332674 A | 11/2001 |
| JP | 2003-297986 A | 10/2003 |
| JP | 2004-260046 A | 9/2004 |
| JP | 2005-223561 A | 8/2005 |

* cited by examiner

Primary Examiner — Zachary M Pape
(74) Attorney, Agent, or Firm — Westerman, Hattori, Daniels & Adrian, LLP

(57) ABSTRACT

A portable electronic apparatus includes a first unit, a second unit, and a hinge unit. The first unit includes a first housing, a heat generating component inside the first housing, a first heat diffusing member disposed inside the first housing and diffusing heat from the heat generating component, and a heat dissipating part dissipating heat diffused by the first heat diffusing member to the outside of the first housing. The second unit includes a second housing, a second heat diffusing member disposed inside the second housing and diffusing heat inside the second housing, and a heat receiving part conducting heat from the heat dissipating part to the second heat diffusing member upon the heat receiving part being in contact with the heat dissipating part.

3 Claims, 14 Drawing Sheets

HEAT DIFFUSING STRUCTURE OF A PORTABLE ELECTRONIC APPARATUS

CROSS-REFERENCE TO RELATED APPLICATION

This application is based upon and claims the benefit of priority of the prior Japanese Patent Application No. 2008-33786, Feb. 14, 2008 filed on, the entire contents of which are incorporated herein by reference.

FIELD

The embodiments discussed herein are related to a heat diffusing structure of a portable electronic apparatus.

BACKGROUND

Portable electronic apparatuses, such as cellular phones and notebook computers, have become smaller and thinner while the amount of heat generated in large-scale integration (LSI) circuits has increased.

To suppress a temperature rise on the housing surface of such an apparatus, a heat diffusing sheet with high heat conductivity and low thickness, such as a graphite sheet or a metal leaf, has been used for diffusing heat in the operation unit or display unit only. However, in recent years, due to a further increase in power consumption and a further reduction in thickness and substrate area of cellular phones, the heat density of cellular phones have increased. As a result, it has become difficult to achieve sufficient cooling in a cellular phone by heat diffusion performed only in the operation unit or display unit of the cellular phone.

SUMMARY

According to an aspect of the invention, there is provided a portable electronic apparatus including a first unit, a second unit, and a connection unit. The first unit includes a first housing, a heat generating component disposed inside the first housing, a first heat diffusing member disposed inside the first housing and configured to diffuse heat inside the first housing, the heat being generated by the heat generating component, and a heat dissipating part configured to dissipate heat diffused by the first heat diffusing member to the outside of the first housing. The second unit includes a second housing, a second heat diffusing member disposed inside the second housing and configured to diffuse heat inside the second housing, and a heat receiving part configured to conduct heat from the heat dissipating part to the second heat diffusing member upon the heat receiving part being in contact with the heat dissipating part. The connection part is configured to connect the first unit to the second unit, and to allow the second unit to be moved relative to the first unit. The heat dissipating part and the heat receiving part are arranged to be brought into contact with each other upon the second unit being moved relative to the first unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
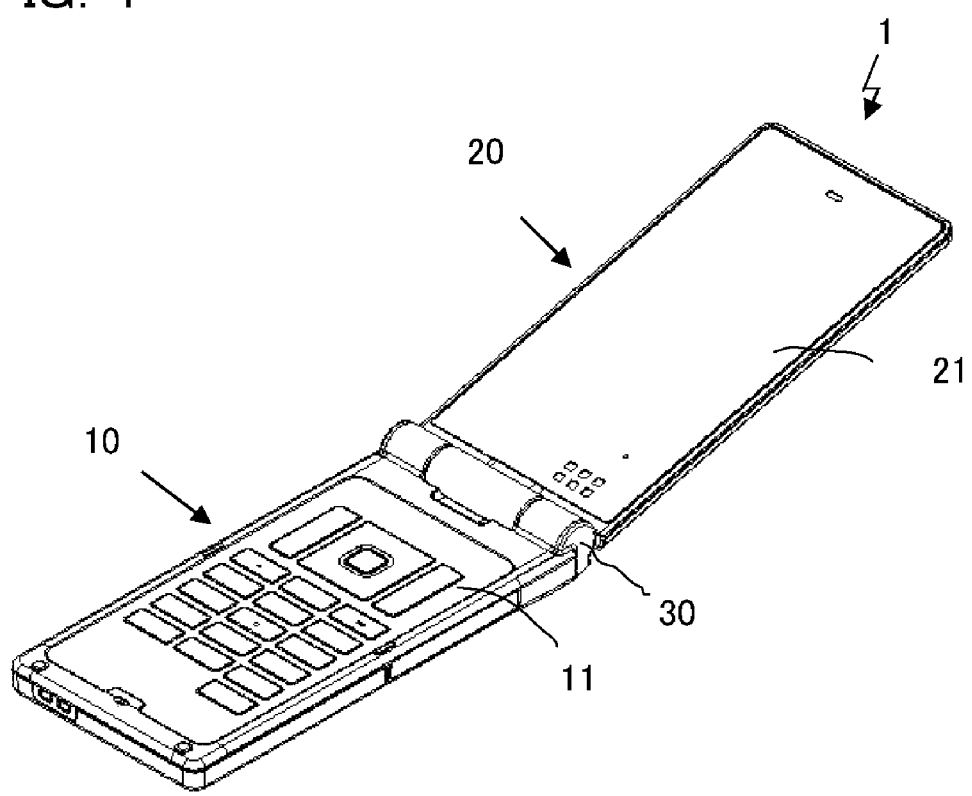
FIG. 1 illustrates a foldable cellular phone.

FIG. 1 is a diagram illustrating a foldable cellular phone 1 in an open state.

The cellular phone 1 includes an operation unit 10 and a display unit 20. The operation unit 10 includes a keypad 11, while the display unit 20 includes a liquid crystal panel 21. In response to a user operation, phone numbers and others are input from the keypad 11. The liquid crystal panel 21 displays various kinds of information. The display unit 20 is connected to the operation unit 10 by a hinge unit 30 as a connection part, and is opened and closed.

Figure 2A:
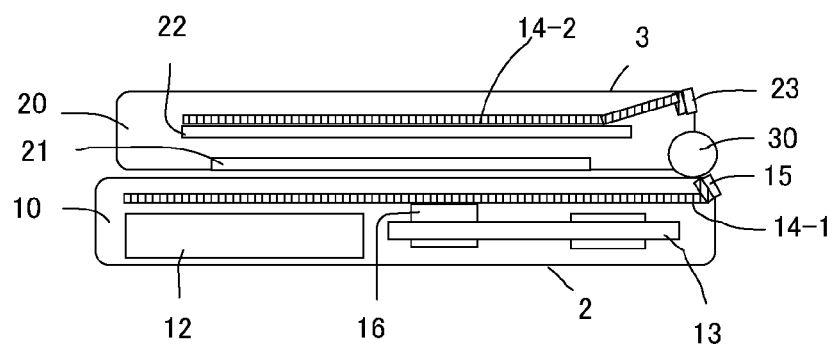
FIG. 2A and FIG. 2B are first diagrams illustrating a heat dissipating structure of the foldable cellular phone.
Figure 2B:
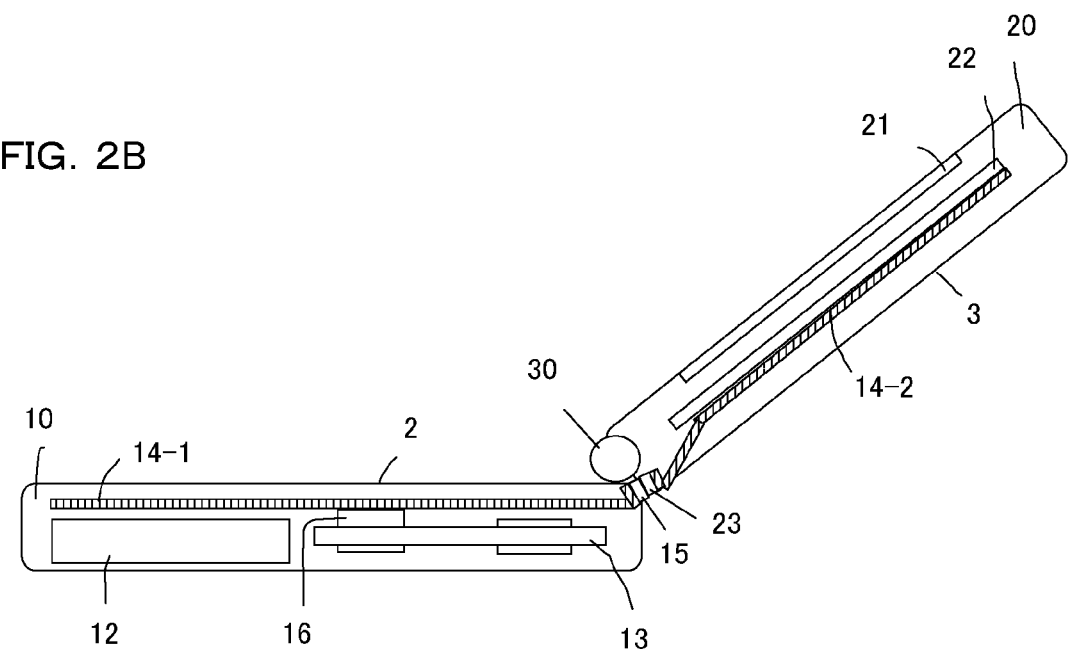

FIG. 2A and FIG. 2B are first diagrams illustrating a heat dissipating structure of the foldable cellular phone 1.

The operation unit 10 includes a housing 2, the keypad 11 (not shown), a battery 12, a substrate 13, a heat diffusing sheet 14-1, and a heat dissipating part 15.

The housing 2 is made of synthetic resin, such as polycarbonate or ABS resin. The housing 2 is a case for accommodating various components of the operation unit 10. The battery 12 supplies electric power to each part. A heat generating component 16, such as a central processing unit (CPU) that performs input control etc., is mounted on the substrate 13. The heat diffusing sheet 14-1 is a sheet for dissipating heat from the heat generating component 16. The heat diffusing sheet 14-1 is a thin sheet with high heat conductivity, such as a metal leaf or a graphite sheet formed by processing graphite into a sheet. The heat diffusing sheet 14-1 may either be in contact with or spaced from the heat generating component 16. The heat dissipating part 15 is a component for diffusing heat from the heat diffusing sheet 14-1 to the display unit 20. The heat dissipating part 15 is made of aluminum, copper, or the like. The heat dissipating part 15 is disposed near the hinge unit 30 and exposed outward from the operation unit 10. The heat dissipating part 15 is configured to be in contact with the heat diffusing sheet 14-1. Alternatively, the heat dissipating part 15 may be integral with the heat diffusing sheet 14-1.

The display unit 20 includes a housing 3, the liquid crystal panel 21, a control substrate 22, a heat diffusing sheet 14-2, and a heat receiving part 23.

The housing 3 is made of synthetic resin, such as polycarbonate or ABS resin. The housing 3 is a case for accommodating various components of the display unit 20. Circuit components for controlling the liquid crystal panel 21 etc. are mounted on the control substrate 22. The heat diffusing sheet 14-2 is a sheet for dissipating heat from the operation unit 10. The heat diffusing sheet 14-2 is made of the same material as that of the heat diffusing sheet 14-1 in the operation unit 10. The heat receiving part 23 comes into contact with the heat dissipating part 15 to conduct heat from the operation unit 10 to the heat diffusing sheet 14-2. The heat receiving part 23 is made of aluminum, copper, or the like. The heat receiving part 23 is disposed near the hinge unit 30 and exposed outward from the display unit 20. The heat receiving part 23 is configured to be in contact with the heat diffusing sheet 14-2. Alternatively, the heat receiving part 23 may be integral with the heat diffusing sheet 14-2.

The hinge unit 30 has a pivot mechanism for opening and closing the display unit 20 relative to the operation unit 10.

Next, a heat dissipating operation will be described.

There will be described an example in which, when the cellular phone 1 is used with the display unit 20 open, the housing temperature of the operation unit 10 is higher than that of the display unit 20.

FIG. 2A illustrates a state in which the display unit 20 of the cellular phone 1 is folded over the operation unit 10. The cellular phone 1 is configured such that the heat dissipating part 15 and the heat receiving part 23 are separated from each other when the display unit 20 is folded over the operation unit 10. This is because when the display unit 20 is folded over the operation unit 10, the cellular phone 1 is in a standby state and thus does not generate much heat.

Since the heat dissipating part 15 and the heat receiving part 23 are brought into or out of contact with each other by movement of the display unit 20, it is not necessary to provide an additional mechanism for conducting heat from the operation unit 10 to the display unit 20 directly through the inside of the hinge unit 30. Therefore, the structure of the hinge unit 30 can be simplified.

FIG. 2B illustrates a state in which the display unit 20 of the foldable cellular phone 1 is open. The cellular phone 1 is configured such that the heat dissipating part 15 and the heat receiving part 23 are brought into contact with each other when the display unit 20 is opened.

First, heat from the heat generating component 16 in the operation unit 10 is conducted to the heat diffusing sheet 14-1. In this example, the heat diffusing sheet 14-1 is in contact with the heat generating component 16. Then, heat in the heat diffusing sheet 14-1 is diffused in the operation unit 10. The housing 2 of the operation unit 10 is not in contact with the heat diffusing sheet 14-1. Therefore, heat in the heat diffusing sheet 14-1 is not directly conducted to the housing 2. Heat from the heat diffusing sheet 14-1 is conducted to the heat dissipating part 15, from which the heat is further conducted to the heat receiving part 23 of the display unit 20.

Then, the heat is further conducted from the heat receiving part 23 to the heat diffusing sheet 14-2. The heat conducted from the heat receiving part 23 to the heat diffusing sheet 14-2 is diffused in the display unit 20. The housing 3 of the display unit 20 is not in contact with the heat diffusing sheet 14-2. Therefore, the heat in the heat diffusing sheet 14-2 is not directly conducted to the housing 3.

Consequently, heat is diffused throughout the entire cellular phone 1. Therefore, it is possible to reduce the surface temperature of the housing 2 of the operation unit 10. Additionally, as illustrated in FIG. 2B, when the heat diffusing sheet 14-2 in the display unit 20 is attached to a part, such as the control substrate 22, which is located as far away as possible from the housing 3, it is possible to effectively prevent a rise in the surface temperature of the housing 3 of the display unit 20.

Figure 3A:
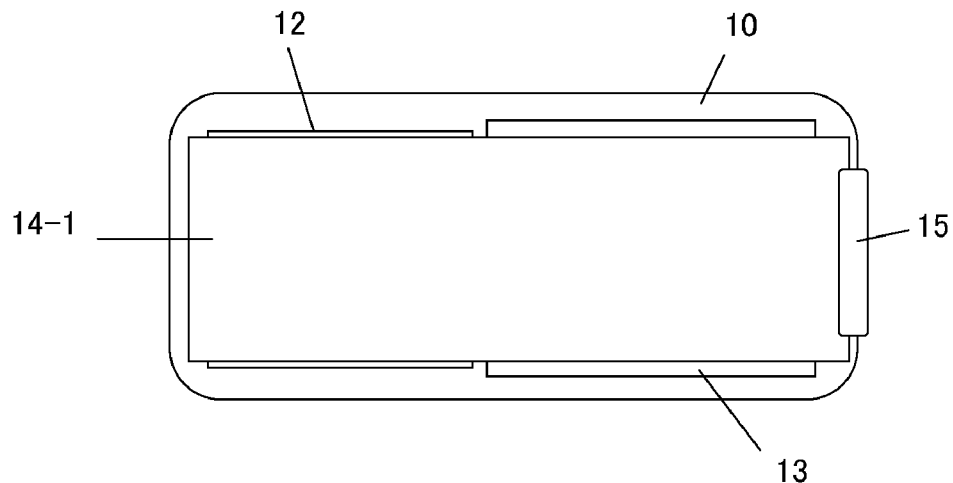
FIG. 3A and FIG. 3B illustrate how heat diffusing sheets are disposed.
Figure 3B:
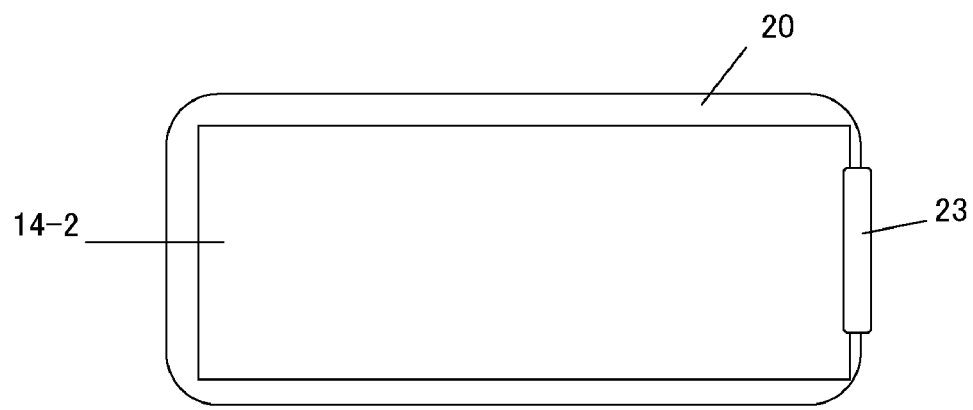

FIG. 3A and FIG. 3B illustrate how the heat diffusing sheets 14-1 and 14-2 are disposed.

FIG. 3A illustrates the heat diffusing sheet 14-1 disposed inside the operation unit 10 and adjacent to the keypad 11. The heat diffusing sheet 14-1 is in contact with the heat dissipating part 15 and extends internally over the operation unit 10 to cover the battery 12 and the substrate 13. The heat diffusing sheet 14-1 is not in direct contact with the housing 2 of the operation unit 10.

FIG. 3B illustrates the heat diffusing sheet 14-2 disposed inside the display unit 20 and adjacent to the rear surface remote from the liquid crystal panel 21. The heat diffusing sheet 14-2 is in contact with the heat receiving part 23 and extends internally over the display unit 20. The heat diffusing sheet 14-2 is not in direct contact with the housing 3 of the display unit 20.

FIG. 4A to FIG. 8B illustrate the heat dissipating part 15 and the heat receiving part 23.

Figure 4A:
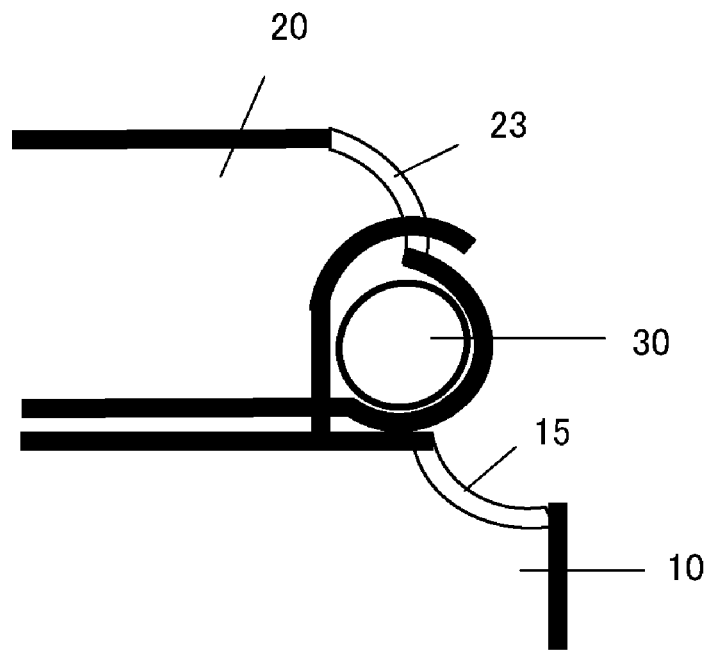
FIG. 4A and FIG. 4B are first diagrams illustrating a heat dissipating part and a heat receiving part.
Figure 4B:
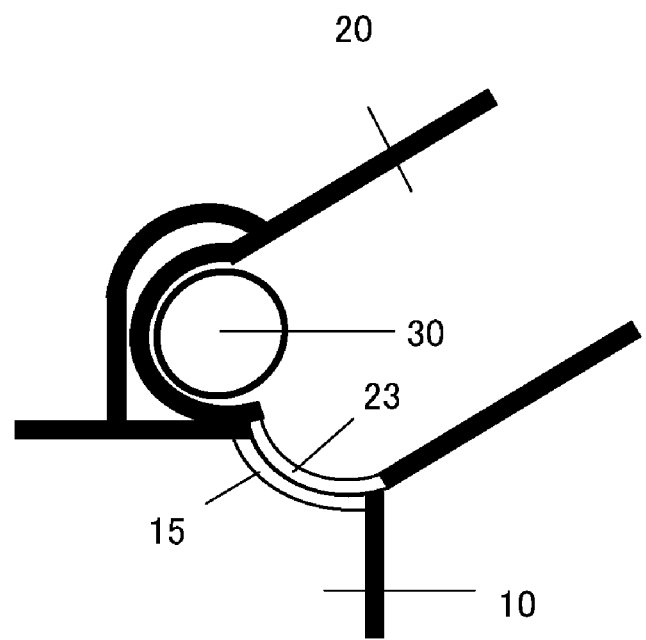

FIG. 4A and FIG. 4B are first diagrams illustrating the heat dissipating part 15 and the heat receiving part 23. The heat dissipating part 15 exposed from the operation unit 10 and the heat receiving part 23 exposed from the display unit 20 are disposed near the hinge unit 30.

FIG. 4A illustrates a structure in which the heat dissipating part 15 and the heat receiving part 23 are separated when the cellular phone 1 is closed.

FIG. 4B illustrates an open state of the cellular phone 1. The display unit 20 pivots by a predetermined angle from the operation unit 10 and is held at a fixed point. This allows the heat receiving part 23 to be in surface contact with the heat dissipating part 15. With this structure, when the cellular phone 1 is open, heat can be conducted from the operation unit 10 to the display unit 20. Thus, heat is diffused evenly throughout the cellular phone 1, and cooling of the entire cellular phone 1 is achieved.

Next, an auxiliary mechanism for enhancing adhesion between the heat dissipating part 15 and the heat receiving part 23 will be described. Enhancing the adhesion between the heat dissipating part 15 and the heat receiving part 23 increases the area of the contact plane therebetween, and thus can improve heat conductivity.

Figure 5A:
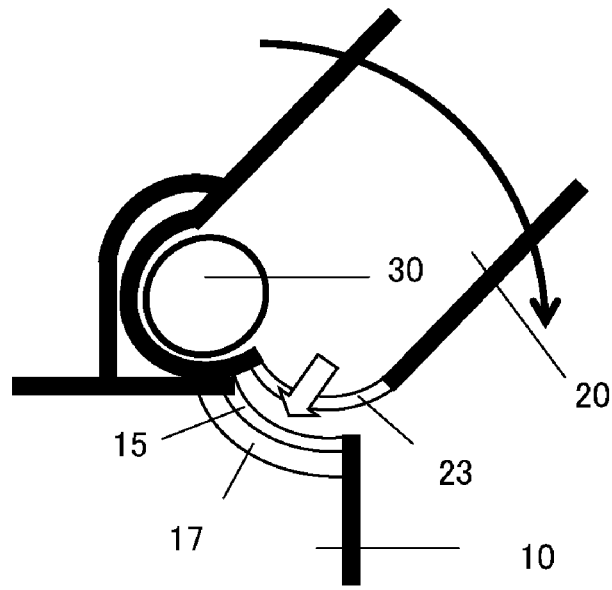
FIG. 5A and FIG. 5B are second diagrams illustrating the heat dissipating part and the heat receiving part.
Figure 5B:
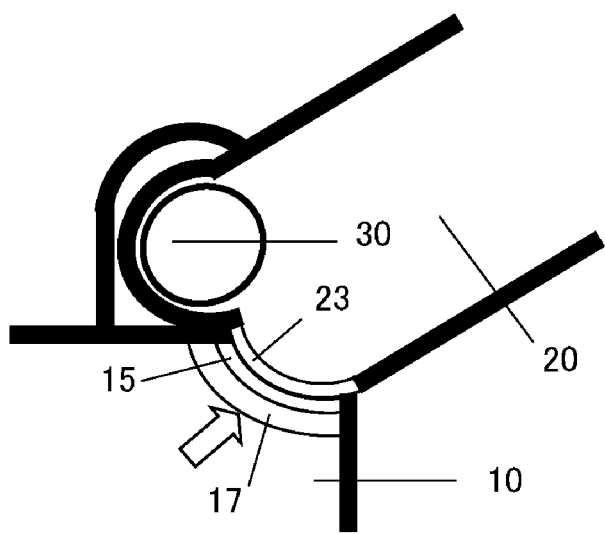

FIG. 5A and FIG. 5B are second diagrams illustrating the heat dissipating part 15 and the heat receiving part 23. Here, an elastic member A 17 serves as an auxiliary mechanism for enhancing adhesion between the heat dissipating part 15 and the heat receiving part 23.

FIG. 5A illustrates a state in which the display unit 20 is pivoting to be opened relative to the operation unit 10. The heat dissipating part 15 is positioned slightly closer to the heat receiving part 23 than to the position at which the heat dissipating part 15 is to be in contact with the heat receiving part 23 and fixed when the display unit 20 is open. The heat dissipating part 15 is supported by the elastic member A 17. That is, the elastic member A 17 is disposed inside the housing 2 of the operation unit 10, and the heat dissipating part 15 is bonded to the elastic member A 17.

FIG. 5B illustrates a state in which the cellular phone 1 is open. When the cellular phone 1 is opened, the heat receiving part 23 is pressed against the heat dissipating part 15 by pivoting of the display unit 20. At the same time, the heat dissipating part 15 is brought into close contact with the heat receiving part 23 by an elastic force of the elastic member A 17. Examples of the elastic member A 17 include a rubber member and a spring. That is, when the heat dissipating part 15 is pressed by the heat receiving part 23, the heat dissipating part 15 is brought into close contact with the heat receiving part 23 by a repulsive force of the elastic member A 17 in the direction indicated by the arrow in FIG. 5B.

Consequently, even if the operation unit 10 and the display unit 20 are in contact with each other in a slightly skewed state, the elastic force of the elastic member A 17 brings the heat dissipating part 15 into close contact with the heat receiving part 23, and thus can improve the efficiency of heat transfer.

Figure 6A:
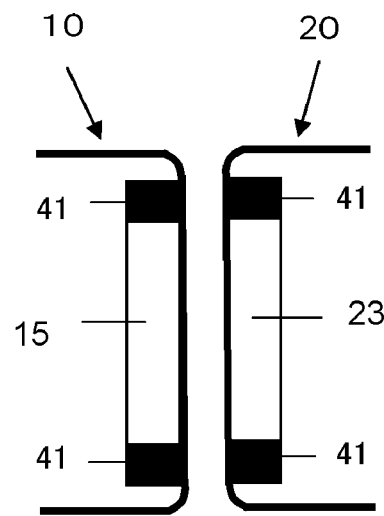
FIG. 6A and FIG. 6B are third diagrams illustrating the heat dissipating part and the heat receiving part.
Figure 6B:
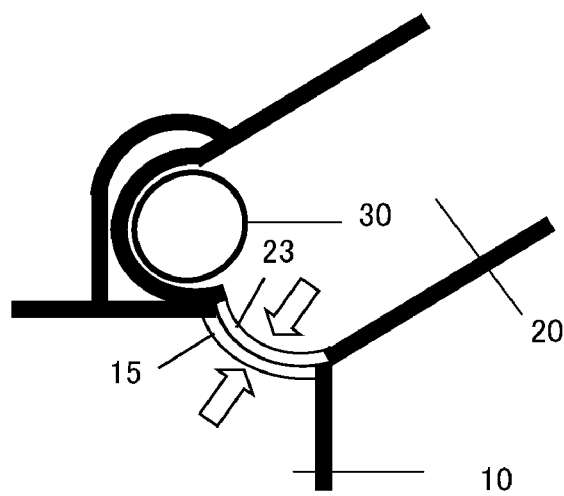

FIG. 6A and FIG. 6B are third diagrams illustrating the heat dissipating part 15 and the heat receiving part 23. Here, magnets 41 serve as an auxiliary mechanism for enhancing adhesion between the heat dissipating part 15 and the heat receiving part 23.

FIG. 6A illustrates a structure in which the magnets 41 attracted to each other are provided in both the heat dissipating part 15 and the heat receiving part 23. The magnets 41 of the heat dissipating part 15 and the magnets 41 of the heat receiving part 23 are disposed opposite each other such that they are attracted to each other.

Consequently, as illustrated in FIG. 6B, when the heat dissipating part 15 and the heat receiving part 23 are in contact with each other, magnetic forces are exerted as indicated by the arrows. Thus, even if the operation unit 10 and the display unit 20 are in contact with each other in a slightly skewed state, the magnetic forces bring the heat receiving part 23 and the heat dissipating part 15 into close contact with each other, and thus can improve the efficiency of heat transfer.

Figure 7A:
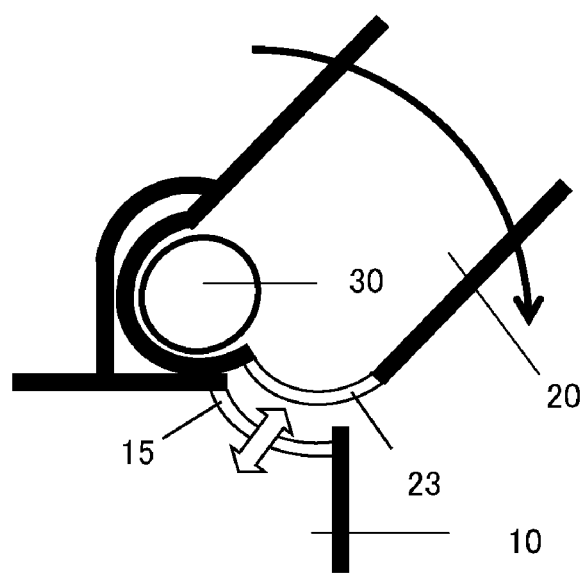
FIG. 7A and FIG. 7B are fourth diagrams illustrating the heat dissipating part and the heat receiving part.
Figure 7B:
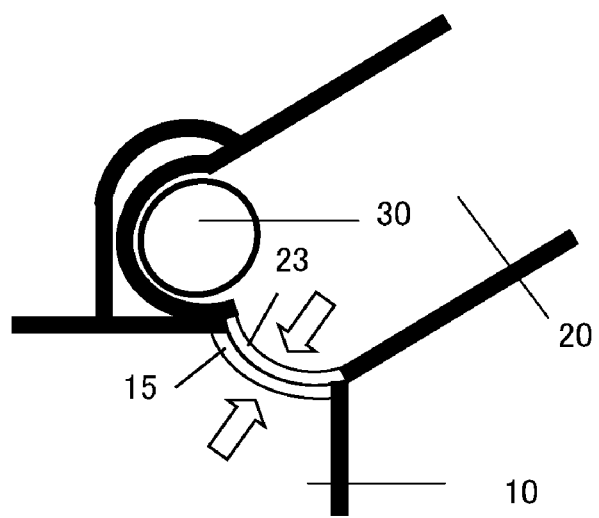

FIG. 7A and FIG. 7B are fourth diagrams illustrating the heat dissipating part 15 and the heat receiving part 23. Here, the magnets 41 disposed at the positions illustrated in FIG. 6A and a moving mechanism for moving the heat dissipating part 15 serve as an auxiliary mechanism for enhancing adhesion between the heat dissipating part 15 and the heat receiving part 23.

FIG. 7A illustrates a state in which the display unit 20 is pivoting to be opened relative to the operation unit 10. As illustrated in FIG. 7A, the heat dissipating part 15 is not completely secured, and is movable in the directions indicated by the two-headed arrow, that is, in the directions substantially orthogonal to the contact plane between the heat dissipating part 15 and the heat receiving part 23. For example, as a moving mechanism for moving the heat dissipating part 15, grooves which allow both ends of the heat dissipating part 15 to slide are provided in the housing 2 of the operation unit 10.

FIG. 7B illustrates a structure in which when the cellular phone 1 is opened, the heat dissipating part 15 is brought into close contact with the heat receiving part 23 by magnetic forces indicated by the arrows.

Consequently, even if the operation unit 10 and the display unit 20 are connected to each other in a slightly skewed state, since the heat dissipating part 15 moves along with the heat receiving part 23, the heat dissipating part 15 and the heat receiving part 23 can be easily brought into close contact with each other, and thus heat efficiency is not degraded.

Figure 8A:
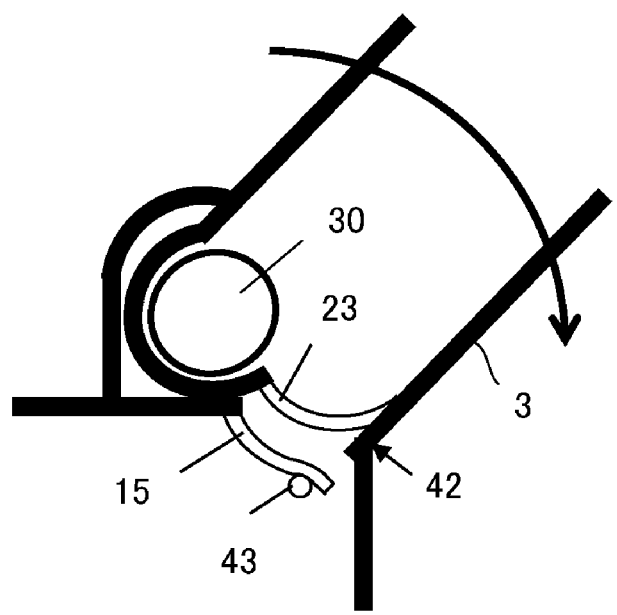
FIG. 8A and FIG. 8B are fifth diagrams illustrating the heat dissipating part and the heat receiving part.
Figure 8B:
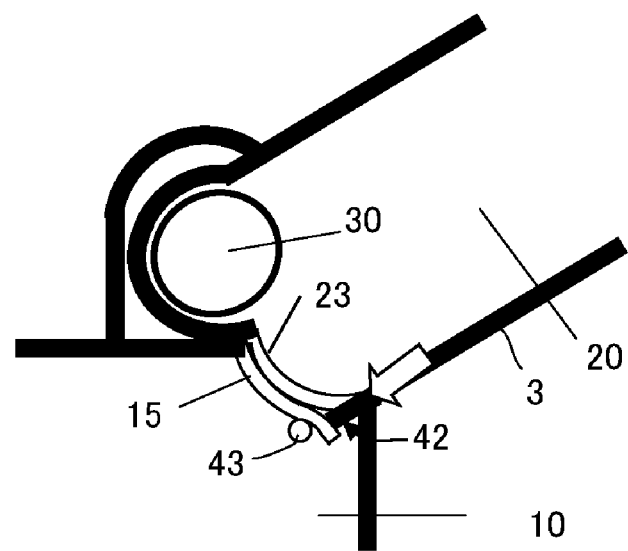

FIG. 8A and FIG. 8B are fifth diagrams illustrating the heat dissipating part 15 and the heat receiving part 23. Here, a protrusion 42 and a pivot shaft 43 serve as an auxiliary mechanism for enhancing adhesion between the heat dissipating part 15 and the heat receiving part 23.

FIG. 8A illustrates a state in which the display unit 20 is pivoting to be opened relative to the operation unit 10. As illustrated, the protrusion 42 is disposed near the heat receiving part 23 of the display unit 20, while the pivot shaft 43 is disposed near the heat dissipating part 15 of the operation unit 10 and is in contact with the heat dissipating part 15. The pivot shaft 43 is configured to allow the heat dissipating part 15 to pivot thereabout. The heat dissipating part 15 is formed such that it can pivot about the pivot shaft 43. The protrusion 42 is formed, for example, by extending an end of the display unit 20.

FIG. 8B illustrates a structure in which when the cellular phone 1 is opened, the heat dissipating part 15 is pressed against the heat receiving part 23. Specifically, pivoting of the display unit 20 causes the protrusion 42 of the display unit 20 to press a predetermined portion of the heat dissipating part 15. This causes the heat dissipating part 15 to pivot about the pivot shaft 43 and come into close contact with the heat receiving part 23.

Consequently, even if the operation unit 10 and the display unit 20 are in contact with each other in a slightly skewed state, the heat receiving part 23 and the heat dissipating part 15 are brought into close contact with each other when the display unit 20 is opened, and thus heat conductivity can be improved.

Figure 9A:
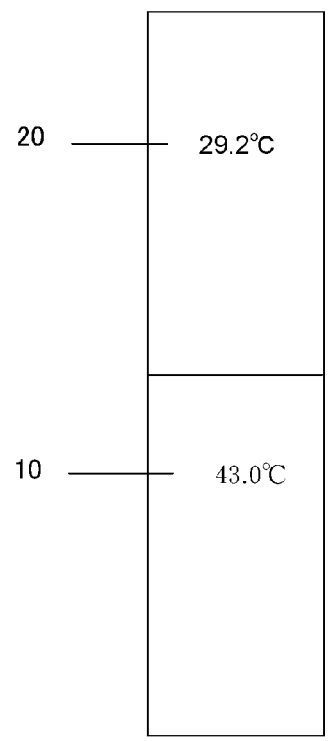
FIG. 9A and FIG. 9B illustrate temperature distributions in cellular phones.
Figure 9B:
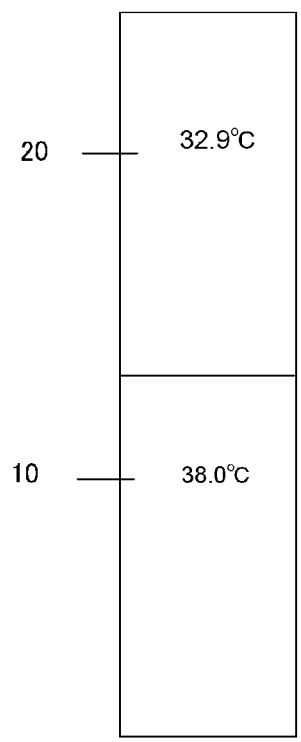

FIG. 9A and FIG. 9B illustrate temperature distributions in cellular phones.

There will be described analyses of temperatures in simulations of the cellular phone 1 according to the first embodiment. The conditions of the simulations were as follows.

An analysis model of the cellular phone 1 was composed of the operation unit 10 and the display unit 20, both measuring 50 mm wide by 105 mm high by 9 mm thick. The ambient temperature was 28° C. A heat diffusing sheet made of graphite had a heat conductivity of 1500 W/m·K. The housing 2 of the operation unit 10 and the housing 3 of the display unit 20 were formed of resin and had a heat conductivity of 0.2 W/m·K. The measurement was made about an example in which a video phone generating a large amount of heat was used for 30 minutes.

FIG. 9A illustrates the case where the heat dissipating part 15 and the heat receiving part 23 were formed of resin, and heat was diffused only in the operation unit 10. The heat conductivity of the resin used was 0.2 W/m·K.

FIG. 9B illustrates the case where the heat dissipating part 15 and the heat receiving part 23 were formed of copper, and heat was diffused from the operation unit 10 to the display unit 20. The heat conductivity of the copper used was 380 W/m·K.

Since the cellular phone 1 of FIG. 9A was in the state where heat diffusion took place only in the operation unit 10, the housing surface temperature of the cellular phone 1 was 29.2° C. in the display unit 20 and 43° C. in the operation unit 10.

On the other hand, since the cellular phone 1 of FIG. 9B was configured to allow heat to diffuse from the operation unit 10 to the display unit 20, the housing surface temperature of the cellular phone 1 was 32.9° C. in the display unit 20 and 38° C. in the operation unit 10.

In the method of FIG. 9A, the housing surface temperature of the operation unit 10 rose to 43° C., which would cause discomfort to the user of the cellular phone 1. However, in the method of FIG. 9B, both the operation unit 10 and the display unit 20 were used as a heat diffusion area. Thus, the housing surface temperature of the operation unit 10 fell to 38° C. This temperature was lower than 43° C. in the case of FIG. 9A, close to body temperature, and thus would not cause discomfort to the user of the cellular phone 1.

Second Embodiment

Figure 10A:
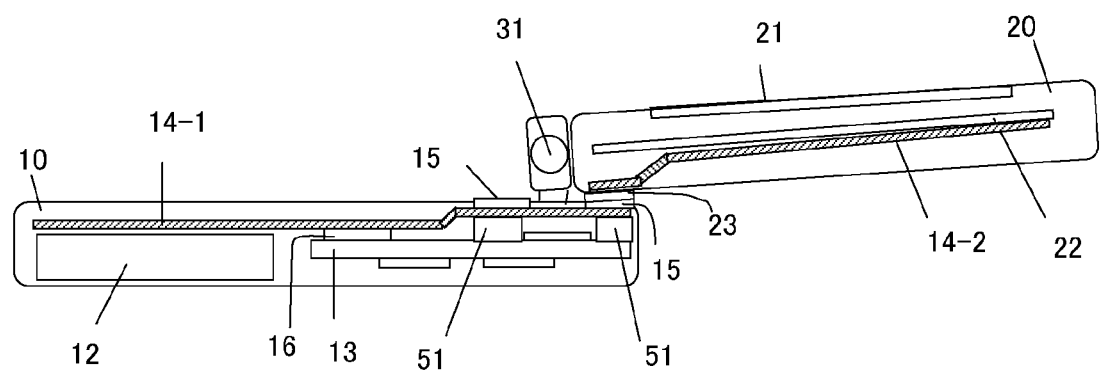
FIG. 10A to FIG. 10C are second diagrams illustrating a heat dissipating structure of the foldable cellular phone.
Figure 10B:
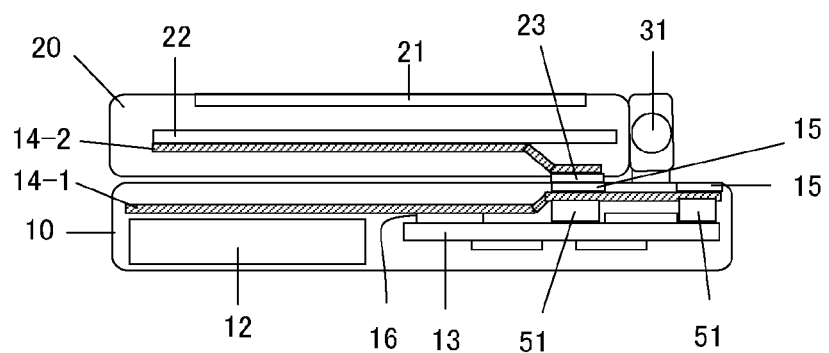
Figure 10C:
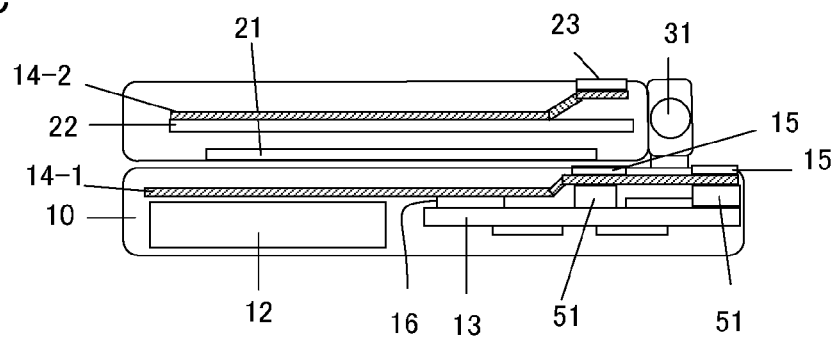

FIG. 10A to FIG. 10C are second diagrams illustrating a heat dissipating structure of the foldable cellular phone 1.

The heat dissipating structure of the cellular phone 1 having a rotating biaxial hinge unit 31 as a connection part, instead of the hinge unit 30 of the first embodiment, will now be described.

Besides a mechanism for opening and closing the display unit 20, the rotating biaxial hinge unit 31 has a reversing mechanism which allows the display unit 20 to rotate 180° horizontally, as viewed from the user. For example, the cellular phone 1 illustrated in FIG. 10A to FIG. 10C is one capable of receiving television broadcasts.

FIG. 10A illustrates a structure in which a heat dissipating part 15 and the heat receiving part 23 are in contact with each other when the display unit 20 of the cellular phone 1 having the rotating biaxial hinge unit 31 is open. For example, the user makes a video phone call or a voice phone call when the cellular phone 1 is in the open state as illustrated in FIG. 10A. Since a large amount of heat is generated in this open state, the cellular phone 1 allows the heat dissipating part 15 and the heat receiving part 23 to be in contact with each other. Thus, when the cellular phone 1 is open, since heat diffuses from the operation unit 10 to the display unit 20 and spreads evenly throughout the cellular phone 1, cooling of the entire cellular phone 1 is achieved.

There are provided two heat dissipating parts 15 near the rotating biaxial hinge unit 31 and on the side of the keypad 11 of the operation unit 10. The heat receiving part 23 is disposed near the rotating biaxial hinge unit 31 and on the rear surface of the display unit 20, the rear surface being remote from the liquid crystal panel 21.

When the display unit 20 is opened to a predetermined angle from the operation unit 10, one of the two heat dissipating parts 15 comes into contact with the heat receiving part 23. When the display unit 20 is reversed and folded over the operation unit 10, the other of the two heat dissipating parts 15 comes into contact with the heat receiving part 23. The heat dissipating parts 15 are disposed in an area seldom touched by the user's hand during operation.

Elastic members B 51, such as springs, are disposed on the substrate 13. The elastic members B 51 press the corresponding heat dissipating parts 15 from under the heat diffusing sheet 14-1, thereby enhancing adhesion with the heat receiving part 23. To press the heat receiving part 23, an additional elastic member B 51 may be provided in the display unit 20. To further improve adhesion, an auxiliary mechanism, such as the magnets described in the first embodiment, may be used.

FIG. 10B illustrates the cellular phone 1 folded with the liquid crystal panel 21 face up. For example, the user watches television broadcasts with the cellular phone 1 folded as illustrated in FIG. 10B. Since much heat is generated when the user watches television broadcasts with the cellular phone 1, the heat dissipating part 15 and the heat receiving part 23 are in contact with each other. Before folding the cellular phone 1, the user rotates the display unit 20 by 180° to view the liquid crystal panel 21. Therefore, when the cellular phone 1 is folded with the liquid crystal panel 21 face up, heat diffuses from the operation unit 10 to the display unit 20 and spreads evenly throughout the cellular phone 1. Thus, cooling of the entire cellular phone 1 is achieved.

FIG. 10C illustrates the cellular phone 1 folded with the liquid crystal panel 21 face down. Since the cellular phone 1 is folded and brought into a standby mode, only a small amount of heat is generated therefrom. Thus, since the heat dissipating part 15 and the heat receiving part 23 are separated from each other, no heat is transferred from the heat dissipating part 15 to the heat receiving part 23.

Figure 11:
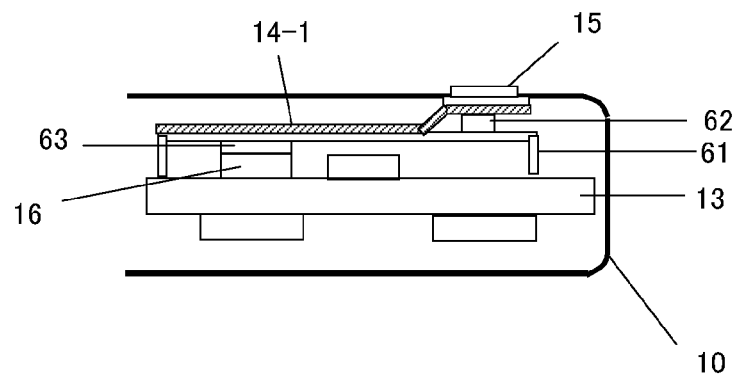
FIG. 11 illustrates a shield case.

FIG. 11 illustrates a shield case 61. To simplify the description of the shield case 61, only a single heat dissipating part 15 is provided in this example.

The heat generating component 16 inside the cellular phone 1 of FIG. 11 may be covered with the shield case 61. The heat diffusing sheet 14-1 is attached to the shield case 61, through which heat is transferred to the heat dissipating part 15.

Heat from the heat generating component 16 inside the shield case 61 is diffused, for example, through a heat conducting sheet 63 to the shield case 61. Then, heat on the shield case 61 is dissipated by the heat diffusing sheet 14-1. Thus, effective heat dissipation can be achieved.

An elastic member C 62, such as a spring, is disposed on the shield case 61. The elastic member C 62 supports the heat dissipating part 15 from under the heat diffusing sheet 14-1, and thereby enhances adhesion between the heat dissipating part 15 and the heat receiving part 23.

Figure 12A:
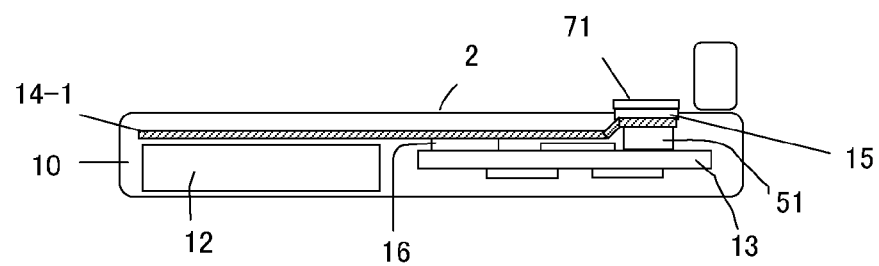
FIG. 12A and FIG. 12B illustrates a protecting sheet.
Figure 12B:
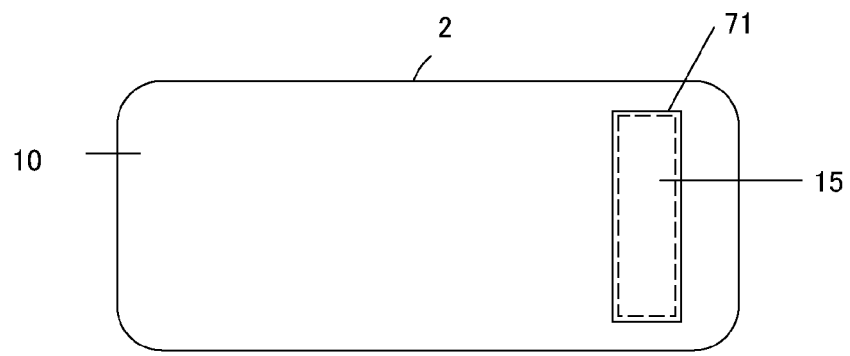

FIG. 12A and FIG. 12B are diagrams illustrating a protecting sheet 71. The operation unit 10 of the cellular phone 1 is illustrated in FIG. 12A and FIG. 12B. To simplify the description of the protecting sheet 71, only a single heat dissipating part 15 is provided in this example.

If a high heat conductivity component, such as a metal component, is exposed from the cellular phone 1, the user may feel hot when touching it with the hand. Therefore, in the cellular phone 1 illustrated in FIG. 12A and FIG. 12B, the heat dissipating part 15 is covered with the protecting sheet 71. This makes it possible to reduce discomfort to the user. Moreover, since the heat dissipating part 15 is in surface contact with the protecting sheet 71, the efficiency of heat transfer is improved. This means that using the protecting sheet 71 having higher heat conductivity is more effective in improving efficiency of heat transfer. For example, the protecting sheet 71 may be made of material that is formed by adding metal filler to silicon rubber and has a heat conductivity of 1 to 5 W/m·K, which is greater than or equal to about 10 times that of resin.

FIG. 12A illustrates the location of the protecting sheet 71 as viewed from one side of the operation unit 10 of the cellular phone 1. FIG. 12B illustrates the location of the protecting sheet 71 as viewed from the surface of the keypad 11 in the operation unit 10 of the cellular phone 1. The protecting sheet 71 may be attached to either one or both of the heat dissipating part 15 and the heat receiving part 23.

Third Embodiment

Figure 13A:
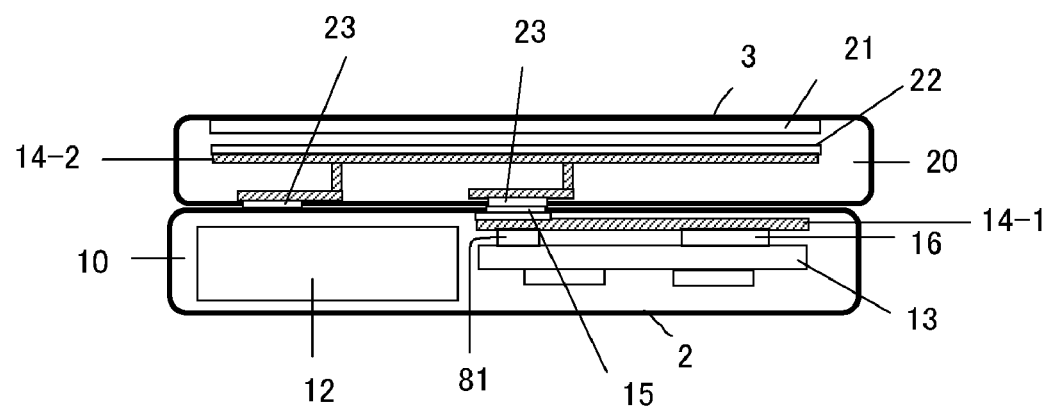
FIG. 13A and FIG. 13B are first diagrams illustrating a heat dissipating structure of a slide cellular phone.
Figure 13B:
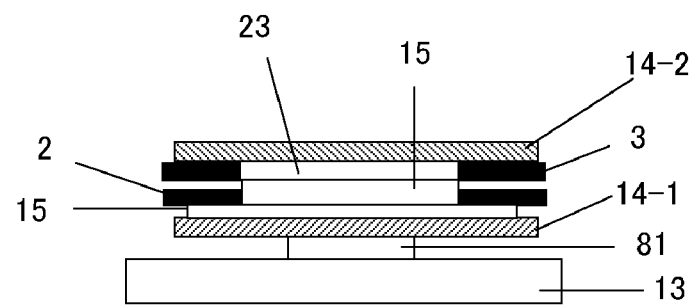

FIG. 13A and FIG. 13B are first diagrams illustrating a heat dissipating structure of a slide cellular phone 1 having a slide mechanism as a connection part, instead of the folding mechanism of the first embodiment.

FIG. 13A illustrates the slide cellular phone 1 in a closed state, that is, in a state where the slide width is zero and the operation unit 10 generates much heat.

Here, the heat diffusing sheet 14-1 in the operation unit 10 is supported by the heat generating component 16 and an elastic member D 81, such as a spring. The heat diffusing sheet 14-1 is in contact with and supports the heat dissipating part 15 slightly protruding from the operation unit 10. The heat dissipating part 15 is in close contact with a heat receiving part 23 of the display unit 20.

When the slide cellular phone 1 is in the closed state, heat can be conducted from the operation unit 10 to the display unit 20 and can spread evenly throughout the cellular phone 1. Thus, cooling of the entire cellular phone 1 is achieved.

FIG. 13B illustrates the heat dissipating part 15 in detail. As illustrated, the elastic member D 81, such as a spring, is disposed on the substrate 13. The heat dissipating part 15 on the heat diffusing sheet 14-1 is pressed by the elastic member D 81 against the heat receiving part 23. The heat receiving part 23 is substantially flush with a surface of the housing 3 of the display unit 20, the surface being remote from the liquid crystal panel 21. On the other hand, the heat dissipating part 15, which is pressed by the elastic member D 81, slightly protrudes from the surface of the housing 2 of the operation unit 10. Thus, the heat dissipating part 15 comes into contact with the heat receiving part 23. The elastic member D 81 serves as an auxiliary mechanism for enhancing adhesion between the heat dissipating part 15 and the heat receiving part 23.

Figure 14A:
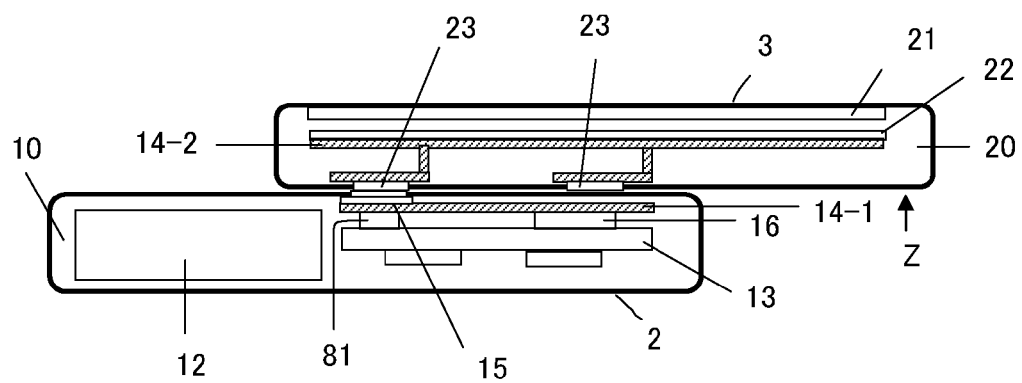
FIG. 14A to FIG. 14C are second diagrams illustrating a heat dissipating structure of the slide cellular phone.
Figure 14B:
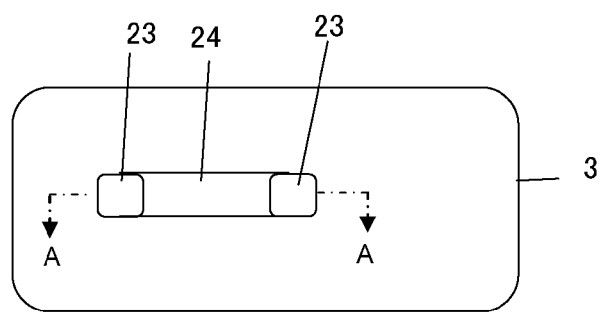
Figure 14C:
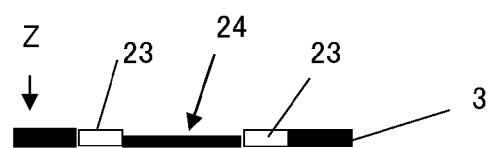

FIG. 14A to FIG. 14C are second diagrams illustrating a heat dissipating structure of the slide cellular phone 1. FIG. 14A to FIG. 14C illustrate a state in which the display unit 20 of the cellular phone 1 has slid fully. The operation unit 10 generates much heat when the slide width is zero or a maximum width. One of the two heat receiving parts 23 is in contact with the heat dissipating part 15 when the slide width is zero, while the other of the two heat receiving parts 23 is in contact with the heat dissipating part 15 when the slide width is the maximum width.

FIG. 14A illustrates a state in which, after the display unit 20 slides fully from the position where the slide width is zero, the heat dissipating part 15 of the operation unit 10 is in contact with one of the two heat receiving parts 23 of the display unit 20.

Thus, as in the case where the slide width is zero, when the display unit 20 is at the position where the slide width is the maximum width, the position of the heat dissipating part 15 of the operation unit 10 coincides with that of the heat receiving part 23 of the display unit 20. Therefore, heat can be conducted from the operation unit 10 to the display unit 20, diffused evenly throughout the cellular phone 1, and cooling of the entire cellular phone 1 is achieved.

FIG. 14B illustrates the two heat receiving parts 23 on the rear surface of the display unit 20, as viewed from the Z-direction of FIG. 14A. The rear surface is a surface of the housing 3 of the display unit 20 and is opposite the surface on which the liquid crystal panel 21 is provided. When the display unit 20 slides, the heat dissipating part 15 slides between the two heat receiving parts 23. The housing 3 of the display unit 20 is provided with a groove 24 which allows the heat dissipating part 15 to slide between the heat receiving parts 23.

FIG. 14C is a cross-sectional view taken along line A-A of FIG. 14B. The upper side of FIG. 14C corresponds to the rear surface of the housing 3. To allow the heat dissipating part 15 to slide between the two heat receiving parts 23, the portion between the heat receiving parts 23 in the housing 3 is reduced in thickness. With this structure, at the position where the heat dissipating part 15 is in contact with one of the heat receiving parts 23, the adhesion between the heat dissipating part 15 and the heat receiving part 23 is improved by the elastic member D 81. On the other hand, in the area where the heat dissipating part 15 slides between the heat receiving parts 23, since no heat receiving part 23 is present in this area, the heat dissipating part 15 is slightly raised by the elastic member D 81. Since the groove 24 is thus provided in this area, the heat dissipating part 15 can slide smoothly between the heat receiving parts 23.

Figure 15:
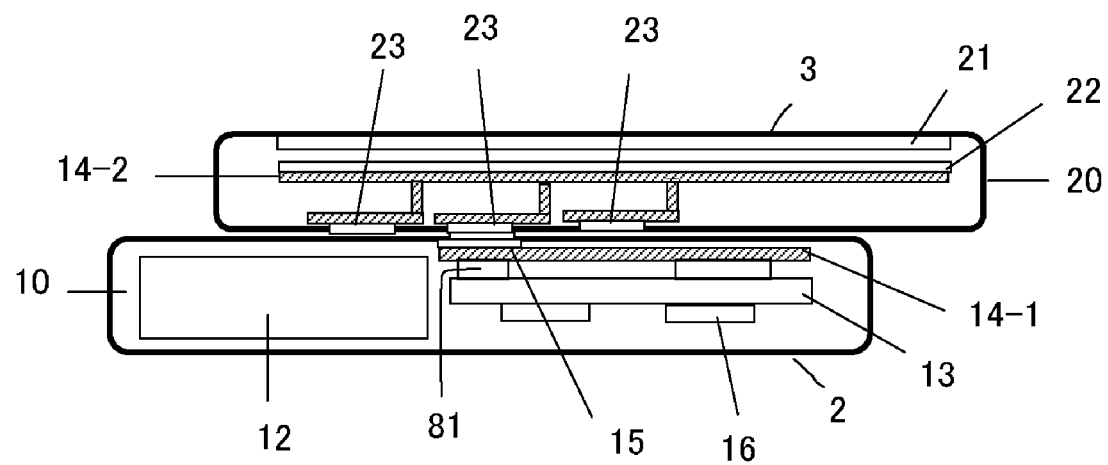
FIG. 15 illustrates the slide cellular phone in which a slide width is a specific width.

FIG. 15 illustrates the slide cellular phone 1 in which the slide width is a specific width. Specifically, a heat receiving part 23 of the display unit 20 is at a specific position where the slide width is a specific width other than zero or a maximum width. As illustrated, there may be provided a plurality of heat receiving parts 23 in the display unit 20. The operation unit 10 generates much heat when the slide width is zero, the maximum width, or the specific width described above.

When any of the heat receiving parts 23 is slid to the position at which the heat dissipating part 15 is located, heat can be conducted from the operation unit 10 to the display unit 20. Thus, heat is diffused evenly throughout the cellular phone 1, and cooling of the entire cellular phone 1 is achieved.

In the case of the cellular phone 1 in which the amount of heat generated by the display unit 20 is greater than that generated by the operation unit 10, the heat receiving part 23 of the display unit 20 is replaced with the heat dissipating part 15, while the heat dissipating part 15 of the operation unit 10 is replaced with the heat receiving part 23.

As described above, heat generated in the operation unit 10 and diffusing in the housing 2 of the operation unit 10 is transferred from the heat dissipating part 15 to the heat receiving part 23 of the display unit 20, and diffuses in the housing 3 of the display unit 20. Thus, since heat diffuses throughout the entire cellular phone 1 without being directly conducted to the housing 2 and the housing 3, a temperature rise on the surface of the housing 2 can be suppressed.

The heat dissipating structure of the shield case 61 and the structure of the protecting sheet 71 described in the second embodiment can also be used in the first and third embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A portable electronic apparatus comprising:
a first unit including
a first housing,
a heat generating component disposed inside the first housing,
a first heat diffusing member disposed inside the first housing and configured to diffuse heat inside the first housing, the heat being generated by the heat generating component, and
a heat dissipating part configured to dissipate heat diffused by the first heat diffusing member to the outside of the first housing,
an elastic member disposed inside the first housing between a substrate and the first heat diffusing member and configured to press the heat dissipating part; and
a second unit configured to slide on the first unit, the second unit including
a second housing,
a second heat diffusing member disposed inside the second housing and configured to diffuse heat inside the second housing, and
a plurality of heat receiving parts disposed to be apart from each other, disposed to be in contact with the heat dissipating part upon a slide width of the second unit being a predetermined width and configured to conduct heat from the heat dissipating part to the second heat diffusing member upon each of the heat receiving parts being in contact with the heat dissipating part.

2. The portable electronic apparatus according to claim 1, wherein one of the plurality of heat receiving parts is arranged to be in contact with the heat dissipating part when the slide width of the second unit is zero width and a maximum width.

3. The portable electronic apparatus according to claim 2, wherein one of the plurality of heat receiving parts is arranged to be in contact with the heat dissipating part when the slide width of the second unit is some width other than zero width and a maximum width.

* * * * *